No. 785,080. PATENTED MAR. 21, 1905.
M. BRESNAHAN & L. H. GAFFNEY.
TERRET RING FOR HARNESS.
APPLICATION FILED NOV. 9, 1903.
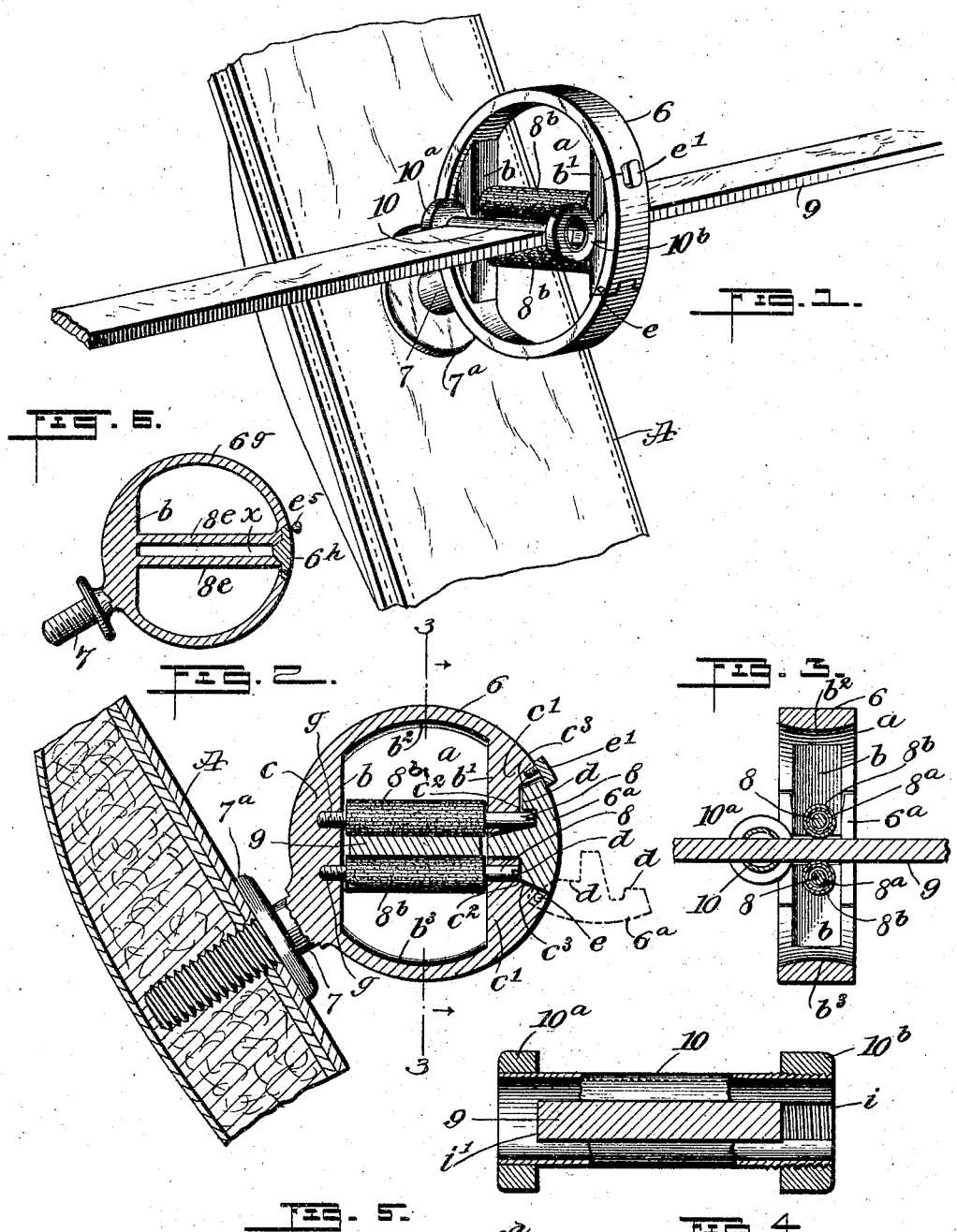
WITNESSES:
Paul Hunter
Wm L. Patton
INVENTORS
Louis H. Gaffney
Micheal Bresnahan
BY
ATTORNEYS No. 785,080. Patented March 21, 1905.

UNITED STATES PATENT OFFICE.

MICHEAL BRESNAHAN, OF COLBY, AND LOUIS H. GAFFNEY, OF GREENBAY, WISCONSIN.

TERRET-RING FOR HARNESS.

SPECIFICATION forming part of Letters Patent No. 785,080, dated March 21, 1905.

Application filed November 9, 1903. Serial No. 180,373.

*To all whom it may concern:*

Be it known that we, MICHEAL BRESNAHAN, a resident of Colby, in the county of Clark, and LOUIS H. GAFFNEY, residing at Greenbay, in the county of Brown, State of Wisconsin, citizens of the United States, have jointly invented a new and Improved Terret-Ring for Harness, of which the following is a full, clear, and exact description.

The object of this invention is to provide novel and effective means for positively controlling a horse or a team of horses, so that the animal or animals will be prevented from pulling forward upon the driving-reins beyond a predetermined limit and also to restrain them from tossing their heads upward or sidewise in attempts to bite each other while standing or in motion.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a perspective view of the invention applied for service on a harness-saddle and on a driving-rein. Fig. 2 is a transverse sectional view, in part, of a harness-saddle and of a driving-rein and a longitudinal sectional view of the improved terret-ring mounted upon the saddle and receiving the rein. Fig. 3 is a transverse sectional view of the ring and rein-clamps and a longitudinal sectional view of the engaged portion of a driving-rein substantially on the line 3 3 in Fig. 2. Fig. 4 is an enlarged side view of the rein-clamp, partly in section, and a transverse sectional view of a driving-rein engaged by the clamp. Fig. 5 is a side view of a terret-ring having rectangular form and provided with the details of improvement, and Fig. 6 is a sectional side view of a terret-ring slightly changed in construction.

The terret-ring body 6, that is preferably formed of cast metal, may have a circular contour, as is shown in Figs. 1, 2, and 3, and an opening $a$ therethrough that is defined by the parallel side walls $b\ b'$ and the concaved upper and lower walls $b^2\ b^3$, thus producing a nearly-rectangular aperture as the inner wall of the terret-ring in the construction therefor indicated in the figures of the drawings mentioned.

From the exterior of the terret-ring body 6 the threaded shank 7 is extended at a suitable angle with regard to the side wall $b$ in the ring, and on the shank, near the ring-body, a collar $7^a$ is formed.

The formation of the aperture $a$ as shown and described affords two thickened walls $c\ c'$, that are respectively defined by the sides $b\ b'$ and the circular periphery of the ring-body, as is clearly shown in Fig. 2.

The wall $c'$ is transversely slotted near its center between the terminations of the side surface $b'$ thereof, and said slot is widened outwardly by giving a zigzag form to its upper and lower walls, thereby producing two shoulders $c^2$, which are in the same vertical plane and from which, at their upper and lower ends, respectively, extend the similarly-flared walls $c^3$ to the peripheral surface of the ring-body, as is shown in Fig. 2.

A filling-block $6^a$ is provided to close the slot-opening in the wall $c'$ of the ring-body, and said block is shaped to exactly fit in said opening and have contact with the zigzag formation of the upper and lower walls of the same, so that offset surfaces $d$ on the filling-block will conform with and may be seated upon the shoulders $c^2$ and such a contact will limit the inward movement of the filling-block, as is shown in Fig. 2.

The exterior surface or edge or the filling-block $6^a$ is convexed and otherwise rounded to give it a form corresponding with the main portion of the periphery of the terret-ring body 6, which the block is a segment of, so that when the block is inserted the ring is rendered practically continuous.

The lower transverse corner of the filling-block and a corresponding corner on the defining-wall of the opening said block fills are hinged together, as indicated at $e$ in Figs. 1 and 2, and it will be seen that the flare given to the upper and lower walls of the opening in the body of the ring and the corresponding formation of the walls on the block that contact therewith permit the free outward swinging movement of the filling-block, so as to expose the slot in the ring-body, this outward adjustment of the filling-block appearing in dotted lines in Fig. 2.

The filling-block $6^a$ is held in closed adjustment by a turn-button $e'$, that is held to turn on the exterior of the ring 6 near the upper transverse corner thereon, the rotatable adjustment of the button causing its wing to overlap upon the exterior upper edge of the block and hold the latter seated upon the offset shoulders $c^2$ in the opening of the ring.

Two practically similar cylindrical journal-shafts 8 8, that are threaded at like ends $g$ thereof, are held to project from the wall $c$ in the ring 6 at a proper distance apart and in parallel planes by an engagement of the ends $g$ within threaded sockets formed in said wall $c$. The journal-shafts 8 extend across the opening $a$ in the ring and are at their opposite ends engaged within transverse perforations formed to receive them in the portions of the bisected wall $c'$, so that said shafts are disposed, respectively, above and below the slot-opening in the side wall $c'$. A preferably metal roller-sleeve $8^a$ is loosely mounted upon each journal-shaft 8, and upon each sleeve a tubular envelop $8^b$ is placed, thus providing elastic coverings for the sleeves.

The diagonal trend of the shank 7 from the wall $c$ of the ring-body 6 causes the rollers that have the coverings $8^b$ to assume a plane that is horizontal or nearly so when the improvement in duplicate is mounted upon the inclined side of the harness-saddle A, as represented in Figs. 1 and 2.

Driving-reins 9 of usual form, one only being shown, receive support from a pair of the improved terret-rings, each being positioned on a corresponding side of the harness-saddle A, and to adapt the terret-rings for the free reception of the reins the closing-block $6^a$ on each ring-body 6 is released and swung down into open adjustment, so that the reins 9, one being shown, may be introduced edgewise between the rollers in the similar terret-rings and be held therein by closure of the blocks $6^a$ and proper adjustment of the turn-buttons $e'$ for an engagement with said blocks at their upper transverse edges, as before explained.

A rein-clamp is an important feature for the proper operation of the invention and preferably consists of a preferably tubular body portion 10, having a fixed annular collar or head $10^a$ on one end and an internally-threaded collar or head $10^b$, screwed upon the externally-threaded opposite end of said body, as is clearly shown in Fig. 4. The body 10 is longitudinally slotted at its diametrical center, said slot $i$ extending from the threaded end of the body to a point $i''$ opposite the inner side surface of the fixed annular head $10^a$.

It is to be understood that a clamp such as has been described may be provided for each driving-rein of a pair provided for guiding and controlling a draft-animal, and to apply the duplicate clamps for use the detachable collar or annular head $10^b$ is removed from the body 10 and said body is slipped laterally upon the rein, the latter of course being introduced edgewise within the slot $i$. The head $10^b$ is now screwed upon the threaded end of the clamp-body 10 and adjusted so as to clamp the edges of the rein tightly between the fixed head $10^a$ and the movable head $10^b$. In applying the duplicate clamps to the respective reins said clamps are mounted thereon at suitable points between the terret-rings and the driver—that is to say, at equal distances from the rear sides of the terret-rings.

The similar spaces between the terret-rings and the clamps on the reins permit the animal to which the reins are connected to carry its head in normal position and move the same; but should the horse endeavor to thrust forward its head, as is usually the case when an attempt to run away is made, the clamps on the reins will be drawn into contact with the rings 6, and this will check such an attempt, serving the same purpose as a forcible pull on the reins by the driver. It will also be apparent that the improvement will prevent the animal from depressing his head or improperly swinging it to either side in an attempt to bite another horse. Furthermore, it prevents at all times an improper slackness of the driving-reins that would permit the animal to tramp on them or cause their entanglement with a tongue of the vehicle in case a double team is employed or with the shafts of the vehicle when but one horse is used.

The improvement greatly reduces the labor of controlling a spirited team of horses or a single horse, and as the reins may be drawn rearward without hindrance the guiding of the team or animal may be readily effected.

The terret-ring may be given a rectangular form if this is preferred, this shape therefor being represented in Fig. 5, wherein the body $6^c$ of the ring is furnished with end walls $c^4 c^5$ at right angles to the parallel upper and lower walls of the ring or frame, the shank $7^c$ projecting diagonally from the lower corner thereof, which is at the junction of the end wall $c^4$ with the bottom wall of the ring or frame. The end wall $c^5$ in this modified construction for the improved terret-ring is slotted transversely at its center and is closed by the hinged closing-block $6^e$, which is secured in closed adjustment by the turn-button $e^2$.

In the frame or rectangular ring $6^c$ the pair of similar spaced rollers $8^d$ are held and adapted to rotate, these rollers being constructed similarly to the rollers hereinbefore described and serve to support a driving-rein placed between them, so that said rein may be longitudinally moved freely in each direction for the control of a draft-animal.

In Fig. 6 we have shown the shafts $8^e$ formed solid at their ends with the ring-body $6^g$ and suitably spaced apart for the reception of a driving-rein between them, the ring having an opening therein opposite the space $x$ between the shafts to permit an insertion of the rein edgewise, as before explained with regard to the shafts that are provided with rollers. A closing-block $6^h$, similar to the closing-blocks already described, is hinged on the frame at the opening and provided with a securing means $e^5$ for holding the block closed, and it will be seen that in function the shafts $8^e$ are the equivalents of those having rollers thereon.

Slight changes within the scope of the invention may be resorted to—as, for example, any available material may be used for its construction other than metal.

The shape of the body or frame of the terret-ring may be oval or polygonal, and if the reins need support from the collar or hames of harness the terret-ring in duplicate may be mounted thereon by any suitable means so as to guide the reins.

Having thus described our invention, we claim as new and desire to secure by Letters Patent—

1. A terret-ring, comprising a ring-like body having an opening therein the defining-walls of which flare outwardly, two spaced rollers in the ring adapted to receive a rein through the opening, a closing-block hinged by one end upon the ring at the opening, the end walls of which conform to the flared walls of said opening, means for securing the block in closed adjustment, and a threaded shank on the terret-ring for securing said ring on the harness.

2. A terret-ring, comprising a ring-like body having an opening therein, two spaced rollers in the ring adapted to receive between them a rein passed through the opening, a closing-block hinged by one end upon the ring at the opening, the end walls of which conform to the flared walls of said opening, a turn-button adapted to hold the closing-block in closed condition, and a threaded shank projected diagonally from the terret-ring for securing it on harness.

3. A terret-ring, comprising a body portion in ring form, two spaced upright walls disposed oppositely in the ring, one of said walls having a slot opening therethrough and spaced perforations in the side walls of the said slot, a closing-block hinged at one transverse edge of the opening for its closure, a turn-button on the ring-body adapted to hold the block closed, two spaced journal-shafts extended from the unslotted wall toward the slotted wall and having their ends supported in the perforations therein, metal sleeves loosely mounted on the shafts between the upright walls, elastic envelops on the sleeves, and a threaded shank extended diagonally from the ring-body for engagement with harness.

In testimony whereof we have signed our names to this specification in the presence of two subscribing witnesses.

MICHEAL BRESNAHAN.
  LOUIS H. GAFFNEY.

Witnesses:
 JOHN F. WATERMOLEN,
 JOHN F. DOCKRY.